United States Patent
Hawkins

[11] 3,713,518
[45] Jan. 30, 1973

[54] DECOUPLER CONTROL

[76] Inventor: Cyril Hawkins, 2643 North Vinewood Drive, Indianapolis, Ind. 46224

[22] Filed: March 3, 1971

[21] Appl. No.: 120,450

[52] U.S. Cl..................................192/46, 192/114
[51] Int. Cl..............................................F16d 41/00
[58] Field of Search......................192/46, 114 R, 42

[56] References Cited

UNITED STATES PATENTS

| | | | |
|---|---|---|---|
| 3,191,732 | 6/1965 | McDowall | 192/48.6 |
| 3,225,876 | 12/1965 | Dison | 192/46 |
| 3,362,245 | 1/1968 | Francuch | 192/114 |
| 3,373,852 | 3/1968 | Hawkins | 192/48.5 |
| 3,458,019 | 7/1969 | Fant et al | 192/114 X |
| 3,498,151 | 3/1970 | King | 192/46 X |

*Primary Examiner*—Allan D. Herrmann
*Attorney*—Paul Fitzpatrick and Jean L. Carpenter

[57] ABSTRACT

Two forms of safety couplings, which are clutching devices which transmit full torque in a forward direction and definitely limited torque in the reverse direction. The devices include a lockin feature, optionally engageable, which prevents disengagement of the clutch, or increases the torque requirement for disengagement, in reverse torque condition. The lockin includes a member threaded to one of the clutched shafts and normally rotative with the shaft which may be braked against rotation and, when braked, moves along the shaft to block disengaging movement of the clutch.

6 Claims, 2 Drawing Figures

PATENTED JAN 30 1973 3,713,518

INVENTOR.
Cyril M. Hawkins
BY
Paul Fitzpatrick
ATTORNEY

DECOUPLER CONTROL

My invention relates to devices known as safety couplings which are commonly employed in turboprop aircraft propulsion plants. In such power plants it is desirable to provide a device which will transmit full engine power in the normal or forward direction of power transmission from the engine to the propeller and which will allow transmission of some torque in the reverse direction (that is, with the propeller motoring the engine), but which has a limit on the reverse torque transmitting capacity. In the event of failure of the engine, unless some automatic decoupling device between the propeller and the engine is immediately actuated, the engine may put a very heavy load on the propeller which in turn acts as a brake on the aircraft and may cause loss of controllability of the aircraft. Such safety couplings are shown, for example, by McDowall U.S. Pat. No. 3,191,732, June 29, 1965, and my U.S. Pat. No. 3,373,852, Mar. 19, 1968. They are used in the well-known Allison Model 501 engines.

The reverse torque capacity of the safety coupling is sufficient to permit starting the engine by windmilling the propeller and to provide a relatively small braking effect on the aircraft as part of a landing maneuver. In some aircraft installations, however, there may be a need for much more substantial braking of the aircraft by the propeller. My invention is directed to means for optionally increasing the reverse torque disengage threshold of the safety coupling, preferably to a level at which decoupling is impossible.

While the decoupling control devices to be described have been conceived for use with a turboprop power plant, it will be apparent that the structures can be used in other situations where it is desirable to vary the disengagement threshold of a torque-disengaged clutch.

The principal objects of my invention are to provide a torque responsive clutch with means for blocking disengagement of the clutch or raising the disengagement threshold; to provide improved means for optionally locking a torque responsive clutch in engagement; to improve the versatility and utility of turboprop aircraft propulsion plants; and to provide a control for a safety coupling which meets requirements of practice and is adapted to incorporation in existing proven types of safety couplings.

The nature of my invention and its advantages will be apparent to those skilled in the art from the succeeding detailed description of preferred embodiments of the invention and the accompanying drawings thereof.

Figure 1:
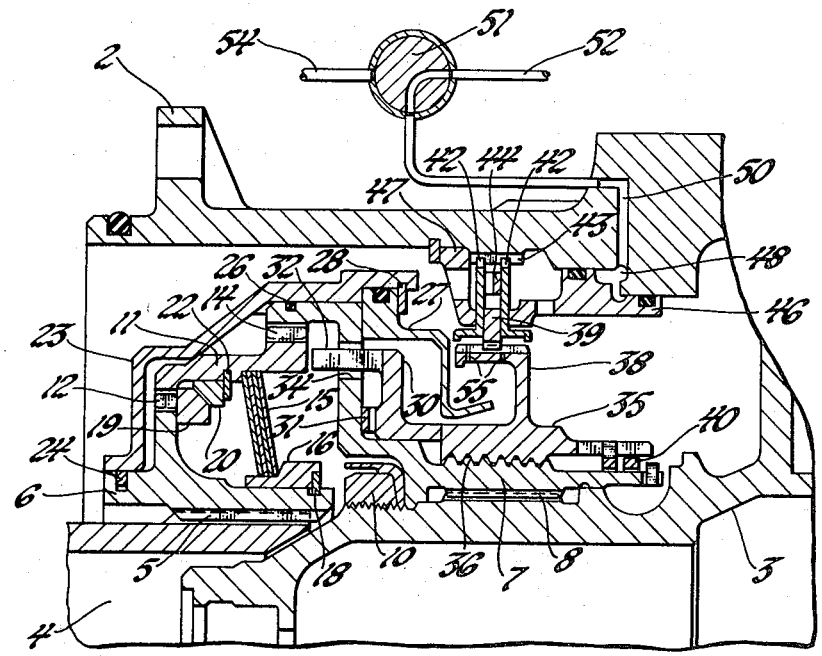
FIG. 1 is a sectional view, taken in a plane containing the axis of rotation, of a first form of safety coupling.
Figure 2:
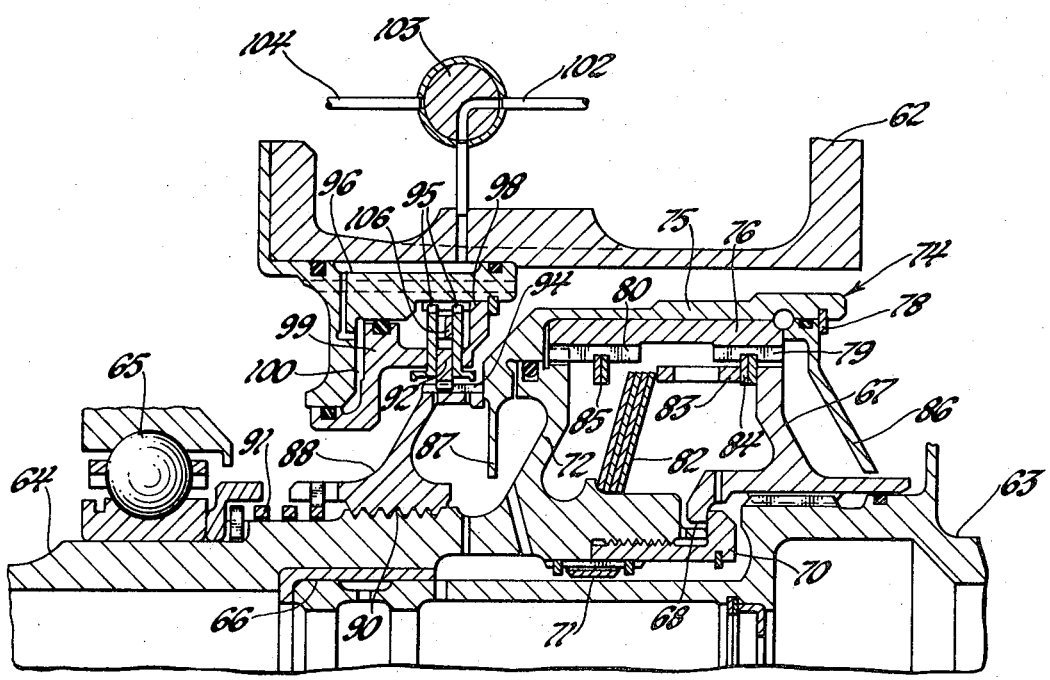
FIG. 2 is a similar view of a second form of safety coupling.

Either of the safety couplings of FIG. 1 or FIG. 2 may be incorporated as part of a reduction gear disposed between a gas turbine engine and a propeller driven by it, as illustrated in Bain U.S. Pat. No. 2,737,018, Mar. 6, 1956. One example of such reduction gear is illustrated by Lindgren et al. U.S. Pat. No. 3,352,178, Nov. 14, 1967. The safety coupling would be a part of shaft 16 of Bain or shaft 26 of Lindgren et al.

Referring first to FIG. 1, the safety coupling includes a housing 2, only partially illustrated, which supports the operative parts of the coupling and may be part of a turboprop engine reduction gear box. The safety coupling includes a power input shaft 3 driven by the power plant and a rotatable power output shaft 4 which drives the propeller. Shaft 4 is coupled by splines 5 to an annular output member 6.

An annular input member 7 is fixed on the hollow input shaft 3. The input member is coupled to the shaft by splines 8 and a nut 10. The input member 7 thus becomes in effect a part of the input shaft 3.

The output member 6 forms one part of a disengageable positive clutch, the other part of which is an intermediate member 11. The intermediate member 11 is coupled to output member 4 by a spline set 12 including internal splines on the member 11 and external splines on member 6. The intermediate member is coupled to the input member 7 by a spline set 14 embodying internal splines on the annular member 7 and external splines on intermediate member 11. One or both of these sets of splines are helical and the difference in helix angle of the splines at 12 and 14 is such that torque in the normal direction in which the engine drives the propeller biases the intermediate member 11 forwardly (to the left as viewed in FIG. 1) to hold the spline set 12 in engagement. Preferably, the spline set 12 is helical and the spline set 14 is straight, but various combinations of spline angles may be employed as a matter of choice in design. The splines 14 are of considerably greater axial extent than splines 12 so that they remain engaged after intermediate member 11 is moved rearwardly far enough to disengage splines 12. Thus, the normal transfer of power from shaft 3 to shaft 4 is through members 7, 11, and 6. The intermediate member is biased into engagement with member 6 by a stack of Belleville springs 15, these engaging an internal shoulder on member 11 and an abutment ring 16 retained on the output member 6 by a snap ring 18. When reverse torque reaches a value such that the thrust of the helical splines will overcome friction and the bias of springs 15, the intermediate member 11 is moved rearwardly to disengage the positive clutch defined by splines 12. Upon such disengagement, the thrust of the Belleville springs is substantially reduced, but a slight ratcheting action of the coupling at splines 12 continues so that, upon resumption of normal torque, the coupling will reengage. Two floating rings 19 and 20 having conical abutting faces are backed up by an expanding snap ring 22. When the clutch is engaged, ring 19 abuts the rear face of the splined portions of member 6 to limit forward movement of member 11.

A casing 23 is disposed around the coupling to contain lubricating oil supplied from within the shafts. This is an annular member which is piloted onto output member 6 and on the perimeter of input member 7. A piston ring seal 24 and an O-ring seal 26 inhibit leakage of oil. The casing is completed by an annular plate 27 mounted within the case 23. The plate 27 is held against the rear face of intermediate member 11 by an expanding snap ring 28.

The structure so far described is essentially a prior art safety coupling to which my invention adds a control of the disengagement. The control features involve a blocking member 30 which is an annular body slidably mounted on the exterior of the input member 7 and biased rearwardly by a wavy spring 31 disposed between adjoining faces of the members. The blocking member 30 includes a ring of prongs 32 extending through holes 34 in the web of the input member 7 and terminating in position to engage the rear face of intermediate member 11.

The hub of blocking member 30 engages the forward face of an actuating nut or holding member 35 mounted on the input member 7 by threads 36. The nut 35 includes an externally splined flange 38 on which is mounted an internally splined brake member 39. The spline connection between these two allows the nut 35 to move axially of the input member without axial movement of the brake member 39. Nut 35 is biased to rotate with input member 7 by a coil torsion spring 40 mounted between members 7 and 35 and having ends engaged in slots in the two members so that the two are relatively rotatable but normally rotate together as long as the shaft 3 rotates and there is no interference with rotation of the actuating nut 35. The brake member 39 may be braked frictionally by impingement of the brake member 39 between two nonrotating brake rings 42 which are slidably coupled to the housing 2 by axially extending splines. The brake rings 42 are normally biased apart, so as to minimize drag on brake member 39, by an annular wavy spring 44 between them. The brake is engaged by a piston 46 slidably mounted in a stepped annular bore in the interior of housing 2. Piston 46 is movable into engagement with one brake ring 42 and the other engages a stop 47 fixed in the interior of housing 2. The piston 46 and the stepped interior of the housing define an annular cylinder 48 to which oil or other fluid under pressure may be admitted through a passage 50 under control of a valve 51 which, as schematically illustrated, is a rotary valve capable of connecting the cylinder to an oil supply line 52 or a vent line 54. The valve 51 may be controlled in any desired manner and may, for example, be a solenoid operated valve responsive to an electric circuit.

As illustrated, the parts are in position to block disengagement of the safety coupling. Fluid under pressure is admitted by valve 51 to cylinder 48 to hold the brake 42, 39 engaged and thus the holding member or actuating nut 35 has been rotated on input member 7 against the torsion of spring 40 to press the blocking member 30 forward so that the prongs 32 prevent any substantial movement of the intermediate member 11 in the declutching direction. If valve 51 is operated to drain the cylinder 48, the brake is released by the wavy spring 44, coil spring 40 retracts the nut 35, and the blocking member 30 may move rearwardly, assisted by the wavy spring 31. In this condition, the safety coupling can release normally by overcoming spring 15.

It will be understood that only rather light drag is required from the brake to cause the actuating nut to move to block release of the coupling if the threads 36 are of low pitch. The brake may be lubricated by oil which serves also to lubricate the other parts of the coupling and which is supplied from within shaft 4 by means immaterial to the present invention. This oil may flow through ports 55 in the splined flange 38 to lubricate and cool the brake.

In the preferred embodiment of the invention, the force exerted by actuating nut 35 is such that no decoupling may occur and thus the safety coupling is locked in engagement. If it is desired to provide a higher disengaging torque limit while still permitting disengagement to occur, the parts may be designed so that the intermediate member 11 can push the members 30 and 35 notwithstanding the engagement of the friction brake. This would require relatively high pitched threads at 36.

FIG. 2 illustrates the application of the same principles of control as in FIG. 1 to a structurally different safety coupling. In the device of FIG. 2, an annular housing 62, only part of which is shown, houses a power input shaft 63 and a power output shaft 64. The output shaft 64 is supported by a ball bearing 65 and the input shaft 63 is journaled at 66 within the output shaft. An annular input member 67 is coupled by splines to the input shaft 63 for rotation with it. The input member is located axially of shaft 63 by an internal flange 68 which is received between a shoulder on the end of output shaft 64 and a collar 70 threaded onto shaft 64. Collar 70 is locked against unthreading by a locking device 71.

The output shaft 64 includes a flange 72 which is externally splined and the input member 67 also is externally splined. These splines cooperate with internal splines on an intermediate member 74 which comprises an outer sleeve 75 and an inner sleeve 76 fixed together by a snap ring 78. The inner sleeve bears helical splines 79 slidably engaging the splined input member 67 and straight splines 80 engaging the splined margin of flange 72. Intermediate member 75 may move forward (to the left as illustrated) to disengage splines 79 from the input member 67. This movement is resisted by Belleville springs 82 which engage a shoulder on shaft 64 and a perforated ring 83. Ring 83 engages an expanding snap ring 84 received in notches in splines 79 which also serves to limit movement of the intermediate member to the right by engagement with input member 67. Movement of the intermediate member in a disengaging direction is limited by a similar snap ring 85 engaged in the crests of splines 80. The intermediate member 74 includes also an annular plate 86 fixed to one end of the intermediate member and an inwardly extending flange 87 at the other end, these defining an annular chamber for lubricating oil. Oil fed to the interior of shaft 63 by means immaterial to my invention can flow through ports in the shaft and through ports in member 64 and 67 to lubricate the splines at 79 and 80. The intermediate member may move forwardly upon development of axial thrust due to the differential pitch of the splines and reverse torque above a predetermined value which deflects the Belleville spring stack 82.

This disengaging movement may be blocked or impeded by control mechanism similar in principle and in most respects of structure to that previously described in FIG. 1. Specifically, a holding member or a blocking nut 88, which combines the functions of the blocking member 30 and actuating nut 35 of the other form of the invention, is mounted by threads 90 on the output shaft 64. It is biased to rotate with the shaft by a coil torsion spring 91, the ends of which define tangs received in slots in the members 64 and 88. The holding member block nut 88 may be braked by a friction brake as shown so that the rear edge portion of the holding member engages the forward face of the intermediate member 74 to prevent or impede decoupling movement of the intermediate member. When the brake is released, the spring 91 acts to rotate the blocking nut 88 relative to shaft 64 so that it moves forwardly and is out of the way of the intermediate member. The brake arrangement in this case comprises an annular brake member 92 slidably mounted by splines 94 on the perimeter of blocking nut 88. The member 92 may be frictionally held between two brake rings 95 slidably mounted on axial splines in the interior of a cylinder 96 fixed within the housing 62. The brake rings are backed up by a stop 98 and are actuated by an annular piston 99 mounted in the stepped cylinder 96 and sealed by O-rings as illustrated. The piston 99 and cylinder 96 define an annular space 100 to which oil under pressure or other actuating fluid is supplied through the obvious passages from a source 102 through a valve 103, which may be as described in connection with FIG. 1, and be capable of connecting the space 100 either to the oil pressure line 102 or vent line 104. The wavy spring 106 acts to separate the rings 95 when the pressure is relieved from the space 100. When this is done, the spring 91 acts to back the blocking nut 88 away from the intermediate member 75 to allow the reverse torque clutch to disengage. As with the previous form, the pitch of threads 90 may be such that the device adds a load to the clutch rather than blocking its disengagement entirely.

In the use of the device, the pilot of the turboprop propelled aircraft may fly in a normal manner and may make use of limited reverse torque when windmilling an engine to start or for braking the aircraft during the landing flare. In the event of failure of the engine, the safety coupling will open and prevent development of high braking force against forward movement of the aircraft by the propeller. If it is desired to employ strong aircraft braking during some maneuver of the aircraft, the pilot may operate the control to energize the piston which engages the friction brake and thus resist or prevent disengagement of the safety coupling.

It should be apparent to those skilled in the art that the structures illustrated are of a practical nature and particularly adapted to achieve the end of controlling the operation of a safety coupling. The safety couplings, as such, are devices which have been tried in service. The addition of the control according to my invention increases the flexibility of the safety coupling and the utility under certain circumstances of an aircraft in which it is incorporated.

The detailed description of the preferred embodiments of the invention for the purpose of explaining the principles thereof is not to be considered as limiting or restricting the invention, as many modifications may be made by the exercise of skill in the art.

I claim:

1. A safety coupling comprising a first rotatable member, a second rotatable member coaxial with the first member, and a positive clutch connecting the members, the clutch including a clutch part movable axially of the members, means biasing the clutch parts into engagement, and means responsive to reverse torque biasing the clutch parts out of engagement, so that the clutch normally disengages when reverse torque exceeds a certain level, in combination with a holding member normally rotatable with the first member, means connecting the holding member to the first member effective to translate the holding member axially of the rotatable members upon relative relation of the holding member and first member, and an optionally engageable friction brake cooperating with the holding member to restrain rotation of the control member when engaged, the holding member including a portion connected to the movable clutch part to provide an additional force acting to hold the clutch engaged when the holding member is translated axially by engagement of the brake.

2. A safety coupling comprising a first rotatable member, a second rotatable member coaxial with the first member, and a positive clutch connecting the members, the clutch including a clutch part movable axially of the members, means biasing the clutch parts into engagement and means responsive to reverse torque biasing the clutch parts out of engagement, so that the clutch normally disengages when reverse torque exceeds a certain level, in combination with a holding member mounted on the first member and normally rotatable with the first member, means connecting the holding member to the first member effective to translate the holding member axially of the rotatable members upon relative relation of the holding member and first member, and an optionally engageable friction brake cooperating with the holding member to restrain rotation of the control member when engaged, the holding member including a portion connected to the movable clutch part to block disengagement of the clutch when the holding member is translated axially by engagement of the brake.

3. A safety coupling comprising a first rotatable member, a second rotatable member coaxial with the first member, and a positive clutch connecting the members, the clutch including a clutch part movable axially of the members, means biasing the clutch parts into engagement, and means responsive to reverse torque biasing the clutch parts out of engagement, so that the clutch normally disengages when reverse torque exceeds a certain level, in combination with a holding member normally rotatable with the first member, means connecting the holding member to the first member effective to translate the holding member axially of the rotatable members upon relative relation of the holding member and first member, an optionally engageable friction brake cooperating with the holding member to restrain rotation of the control member when engaged, a fluid pressure actuator effective to engage the brake, and means effective to lubricate and cool the brake, the holding member including a portion connected to the movable clutch part to provide an additional force acting to hold the clutch engaged when the holding member is translated axially by engagement of the brake.

4. A safety coupling comprising an input shaft, an output shaft coaxial with the input shaft, and a positive clutch connecting the shafts, the clutch including relatively movable clutching parts, means biasing the parts into engagement, and means responsive to reverse torque biasing the parts out of engagement, so that the clutch normally disengages when reverse torque exceeds a certain level, in combination with a holding member mounted on one said shaft and normally rotatable with the shaft, means connecting the holding member to the shaft effective to translate the holding member axially of the shaft upon relative rotation of the shaft and holding member, and an optionally engageable friction brake cooperating with the holding member, the holding member including a portion engaging a clutch part to provide an additional force acting to hold the clutch engaged when the holding member is translated along the shaft by engagement of the brake.

5. A coupling as defined in claim 4 in which the holding member is mounted on the input shaft.

6. A coupling as defined in claim 4 in which the holding member is mounted on the output shaft.

* * * * *